UNITED STATES PATENT OFFICE.

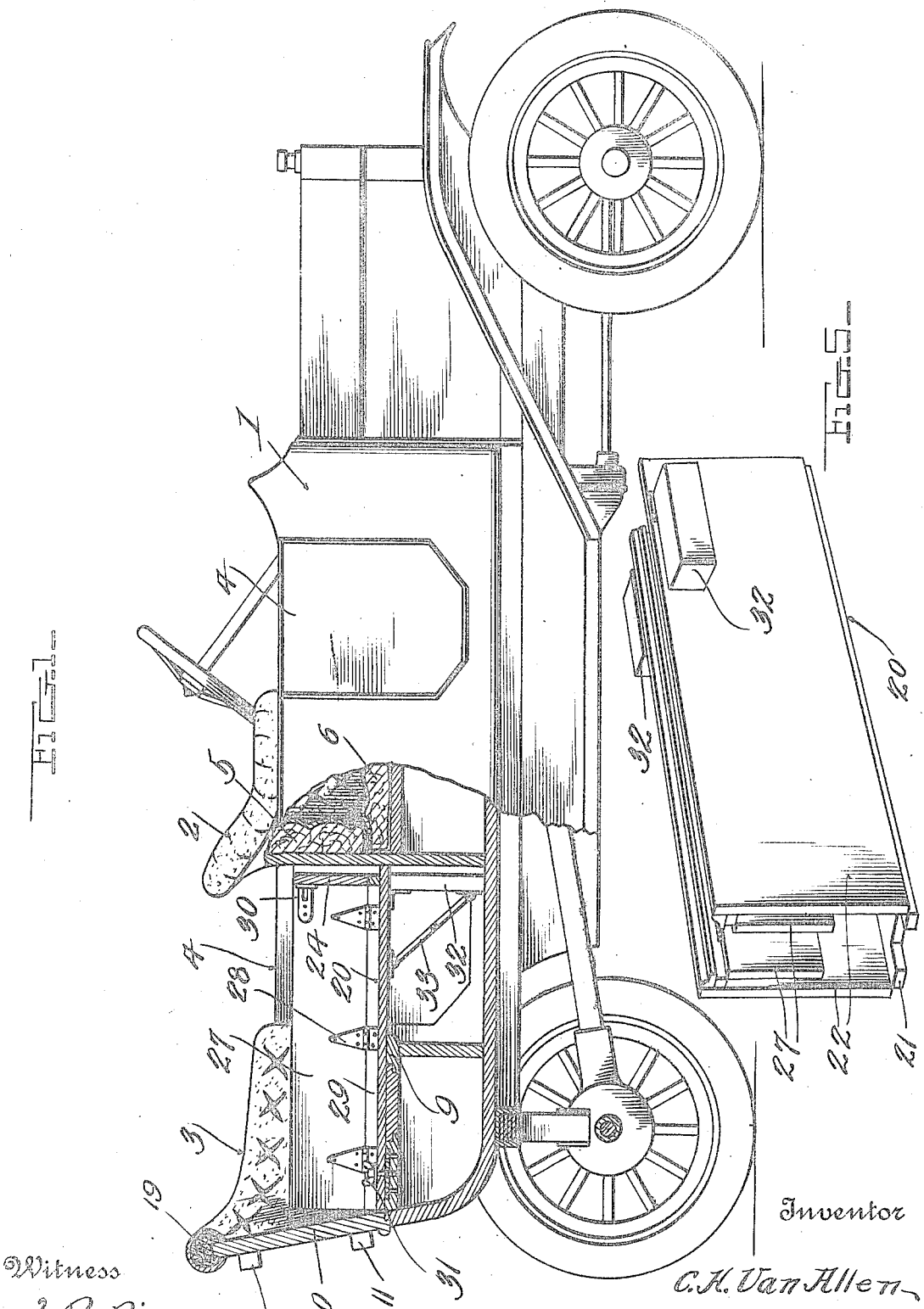

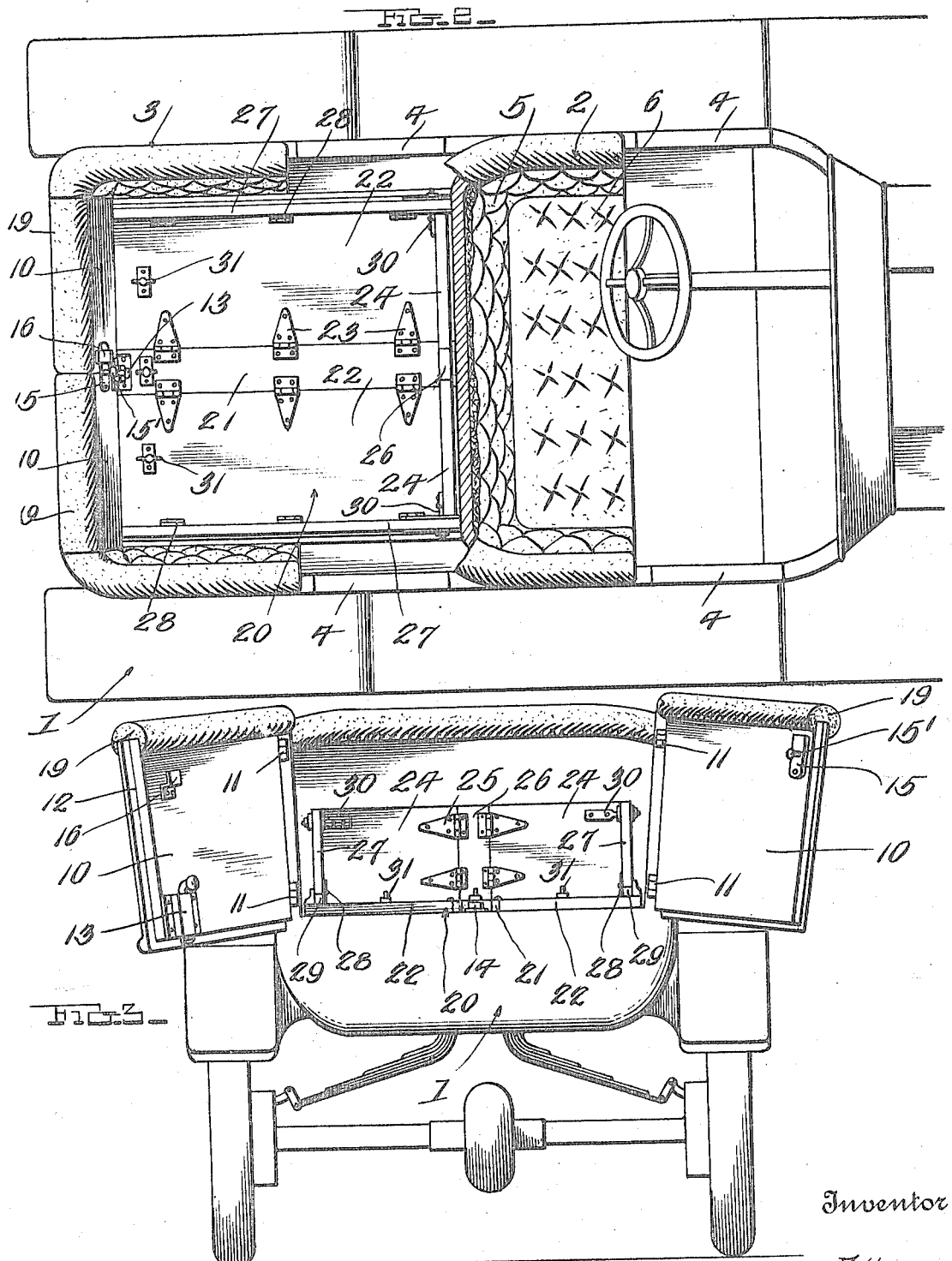

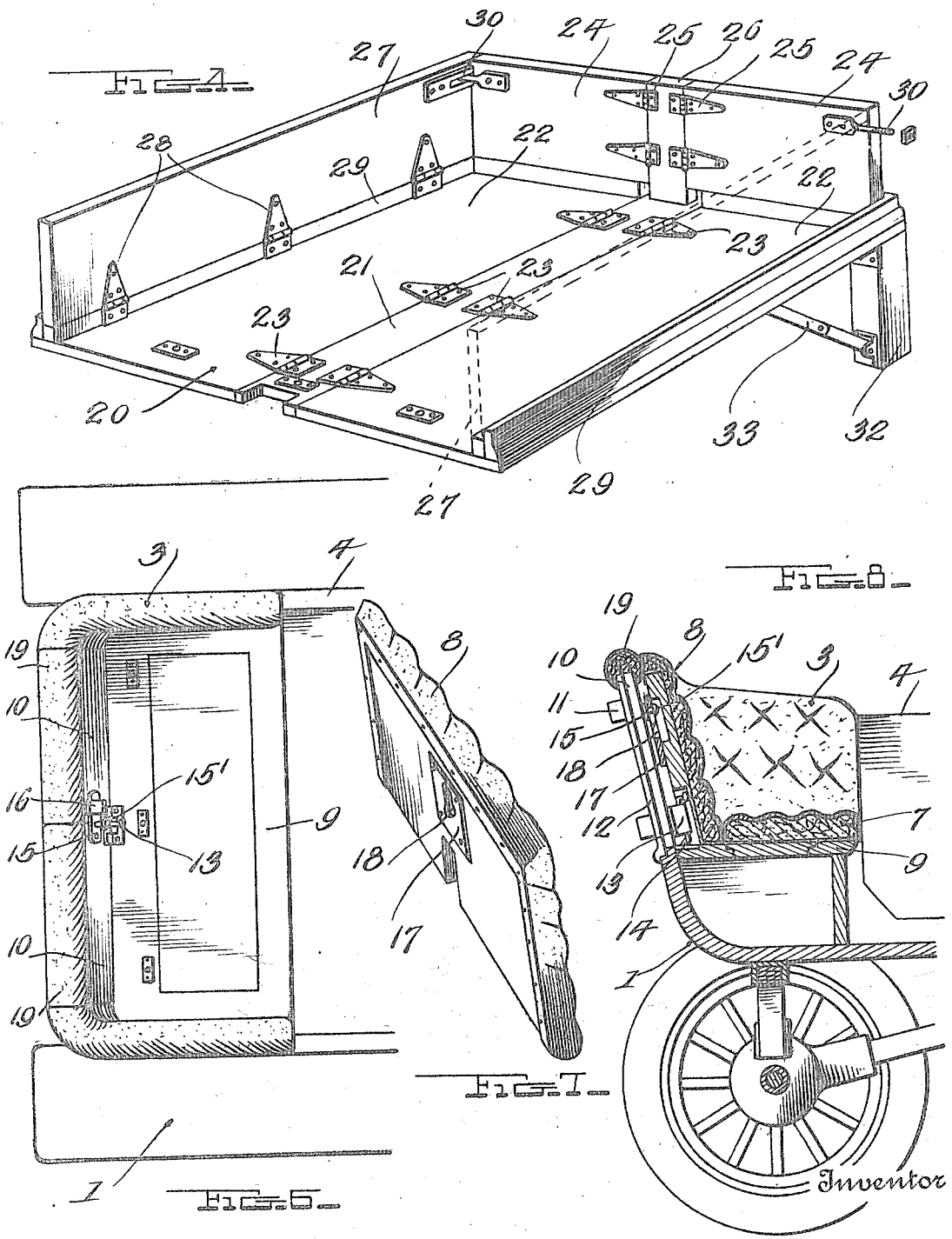

CHARLES H. VAN ALLEN, OF PATERSON, NEW JERSEY.

AUTOMOBILE-BODY.

1,208,053.   Specification of Letters Patent.   Patented Dec. 12, 1916.

Application filed July 3, 1916. Serial No. 107,352.

*To all whom it may concern:*

Be it known that I, CHARLES H. VAN ALLEN, a citizen of the United States, residing at Paterson, in the county of Passaic and State of New Jersey, have invented certain new and useful Improvements in Automobile-Bodies; and I do declare the following to be a full, clear, and exact description of the invention, such as will enable others skilled in the art to which it appertains to make and use the same.

My invention which relates to improvements in automobile bodies, has for its object to so construct a touring car body as to permit the same to be used for light hauling when required and again converted into a sightly passenger carrier at will.

With this general object in view, the invention resides in certain novel features of construction and in unique combinations of parts to be hereinafter fully described and claimed, the descriptive matter being supplemented by the accompanying drawings which constitute a part of this application, and in which:

Figure 1 is a side elevation partly in section showing the improved body; Fig. 2 is a top plan view with parts broken away and in section; Fig. 3 is a rear elevation with the rear doors open; Fig. 4 is a perspective view of the detachable load carrying platform which is secured to the rear seat frame; Fig. 5 is a similar view of said platform in folded position; Fig. 6 is a top plan view of the rear end of the body showing more particularly a latch employed for locking the rear doors in closed position; Fig. 7 is a perspective view of the rear seat back; and Fig. 8 is a longitudinal section showing the manner in which said seat back holds the aforesaid latch in operative position.

In specifically describing the structure shown in the drawings above briefly described, similar characters will be employed to designate corresponding parts throughout the several views and reference will be herein made to the numerous elements by their respective indices. To this end, the numeral 1 designates broadly the body of a well known type of touring car, said body having the usual front and rear seats 2 and 3 and doors 4 for gaining access to either seat. The back and seat cushions 5 and 6 respectively of the front seat 2 are disposed as usual, but due to the nature of the invention, the seat cushion 7 and back 8 of the rear seat 3 are detachable.

The rear end of the body 1 is formed with a doorway which opens through its upper edge, the lower edge of said doorway terminating flush with the rear seat frame 9 upon which the cushion 7 is supported when the vehicle is being used for carrying passengers. Two doors 10 are shown in the present embodiment of the invention for closing the doorway, but it will be understood that one door of suitable size could be used if found desirable. Both doors 10 are hinged at their outer edges as shown at 11, while their inner edges will abut when closed, as will be clear from Figs. 2 and 6, one of said doors having a projecting molding 12 to overlie the inner edge of the other door. The door equipped with the molding 12 is also provided with a suitable latch 13 for coöperation with a stop 14 secured on the seat frame 9, said latch and the molding 12 serving to hold both doors in closed position.

To prevent spreading or warping of the upper edges of the doors 10, an additional latch 15 is pivoted to one of said doors to swing downwardly into a keeper 16 on the other as shown clearly in Figs. 2 and 6, said latch having an operating knob 15' which projects into the body 1 when the doors are closed. The seat back 8 has secured to its rear side a plate 17 formed with a keyhole slot or socket 18, this socket being adapted to receive therein the knob 15' when the back 8 is applied as shown in Fig. 8. It will thus be evident that the back will not only be held in operative position, but the latch 15 will be prevented from becoming unfastened, these features being therefore deemed rather important. When the back 8 is in use, its upper edge contacts with cushions 19 which extend along the upper edges of the doors 10 and thus an extremely neat appearance prevails.

When the back 8 and cushion 7 are removed, a load-carrying platform 20 is adapted to be secured to the seat frame 9 and to extend forwardly from this frame to the back of the front seat 2 as shown clearly in Figs. 1 and 2. The platform 20 is formed of a central section or board 21 and two side sections 22 hinged thereto as indicated at 23, the front ends of the sections 22 being provided with vertical walls 24 hinged at 25 to a post 26 which rises from the front end of the section 21. A pair of side walls or boards 27 are hinged at 28 to cleats 29 extending along the edges of the sections 22, and at 30 said side boards 27 are detachably connected with the walls 24. The entire structure 20 is adapted to rest on the frame 9 as shown most clearly in Fig. 1 and to be secured in this position by a number of thumb screws 31 or other suitable fasteners, the front end of the platform 20 being supported by folding legs 32 equipped with braces 33 which may be also folded.

When the platform 20 is in use in the manner described, numerous kinds of light hauling may be done in the tonneau of the body 1, the doors 10 permitting the loading and unloading thereof, and the walls 24 and 27 serving to prevent mutilation or injury of the interior of the body. When the machine is to be again converted for carrying passengers, the platform 20 will be removed and the connections 30 will be detached. The sides 27 are now sprung outwardly to a sufficient extent to permit the end walls or boards 24 to be swung inwardly above the central section 21, and this having been done, the side boards 27 are folded downwardly onto the sections 22. These sections are now swung upwardly around their hinges 23 and the entire device will then assume the compact shape depicted in Fig. 5, and may be stored in little space. The doors 10 will now be locked in closed position and the cushions 7 and 8 will be applied, said cushion 8 serving to retain the latch 15 in operative position in the manner above described.

By constructing the body in the manner shown and described it will be obvious that the same will be highly efficient and durable both for light hauling and for carrying passengers, the invention being therefore well adapted to a wide range of uses, but being particularly advantageous for traveling salesmen who carry produce from place to place during the week and on Sundays use the machine for recreation.

In the foregoing I have described certain specific details of construction for the attainment of probably the best results, and in the accompanying drawings such details have been shown, but it is to be understood that within the scope of the invention as claimed numerous changes may be made without sacrificing the main advantages thereof.

I claim:

1. A touring car body having in its rear end a doorway opening through the upper edge of said end, the lower edge of said doorway being substantially flush with the rear seat frame, a detachable platform to be mounted in the body and to extend from said seat frame to the back of the front seat, and one or more doors for closing said doorway.

2. A touring car body having in its rear end a doorway opening through the upper edge of said end, the lower edge of said doorway being substantially flush with the rear seat frame, a detachable platform to be mounted in the body and to extend from said seat frame to the back of the front seat; one or more doors for closing said doorway, and a rear seat back having a detachable connection with said door or doors.

3. A touring car body having in its rear end a doorway opening through the upper edge of said end, the lower edge of said doorway being substantially flush with the rear seat frame, a detachable platform to be mounted in the body and to extend from said seat frame to the back of the front seat, one or more doors for closing said doorway, a latch for holding said door or doors in closed position, and a removable seat back equipped with means for holding said latch in operative position.

4. A touring car body having in its rear end a doorway opening through the upper edge of said end, the lower edge of said doorway being substantially flush with the rear seat frame, a detachable platform to be mounted in the body and to extend from said seat frame to the back of the front seat, one or more doors for closing said doorway, a latch for locking the door or doors in closed position, said latch having an operating knob, and a rear seat back having a socket member on its rear side removably receiving said knob to simultaneously retain said back and the latch in operative position.

5. A touring car body having in its rear end a doorway opening through the upper edge of said end, the lower edge of said doorway being substantially flush with the rear seat frame, a detachable platform to be mounted in the body and to extend from said seat frame to the back of the front seat, one or more doors for closing said doorway, a knob extending inwardly from one of said doors, and a seat back having on its rear side a socket member removably receiving said knob therein, whereby to retain said seat back in operative position.

6. The combination with a touring car body having a door in its rear end; of a load carrying platform to rest on the rear seat frame and to extend forwardly from said frame to the back of the front seat, a front wall at the front end of said platform to prevent injury of said back of the front seat, and side walls also rising from said platform to prevent mutilation of the sides of the body.

7. The combination with a touring car body having a door in its rear end; of a platform adapted to rest on the rear seat frame and to extend forwardly therefrom to the back of the front seat, said platform consisting of a central and two side sections foldably hinged together, downwardly folding side boards rising from and hinged to the outer edges of said side sections, a post rising from the front end of the central section, inwardly folding end boards hinged to said post, and detachable connections between the end and side boards.

In testimony whereof I have hereunto set my hand in the presence of two subscribing witnesses.

CHARLES H. VAN ALLEN.

Witnesses:
 WILLIAM H. YOUNG,
 PAULINE SUKINIK.